United States Patent
Pan et al.

(10) Patent No.: US 11,477,213 B2
(45) Date of Patent: Oct. 18, 2022

(54) TECHNOLOGIES FOR PROVIDING SECURE EMERGENCY POWER CONTROL OF HIGH VOLTAGE DIRECT CURRENT TRANSMISSION SYSTEM

(71) Applicant: ABB Schweiz AG, Baden (CH)

(72) Inventors: Jiuping Pan, Raleigh, NC (US); Reynaldo Nuqui, Cary, NC (US); Anil Kondabathini, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 686 days.

(21) Appl. No.: 16/148,043

(22) Filed: Oct. 1, 2018

(65) Prior Publication Data

US 2020/0104536 A1  Apr. 2, 2020

(51) Int. Cl.
*H04L 9/40*  (2022.01)
*H02J 3/36*  (2006.01)
*H02J 3/00*  (2006.01)

(52) U.S. Cl.
CPC ............ *H04L 63/1416* (2013.01); *H02J 3/36* (2013.01); *H02J 3/001* (2020.01)

(58) Field of Classification Search
CPC ......................... H02J 3/36; H04L 63/14–1416
See application file for complete search history.

(56) References Cited

U.S. PATENT DOCUMENTS

| | | | |
|---|---|---|---|
| 2013/0033234 A1* | 2/2013 | Koritarov | H02J 3/24 320/137 |
| 2017/0009388 A1 | 3/2017 | McEachern et al. | |
| 2017/0163029 A1 | 6/2017 | Hong et al. | |

FOREIGN PATENT DOCUMENTS

| | | | |
|---|---|---|---|
| DE | 102015006868 A1 * | 12/2016 | ......... G01R 19/2513 |
| WO | WO-2019140584 A1 * | 7/2019 | ................ H02J 3/36 |

OTHER PUBLICATIONS

A.E. Hammad, "Stability and Control of HVDC and AC Transmissions in Parallel", IEEE Transactions on Power Systems, vol. 14, No. 4, Oct. 1999.

L. Zhang, L. Harnefors, P. Rey, Power System Reliability and Transfer Capability Improvement by VSC-HVDC, CIGRÉ Conference, Tallinn, Estonia, Jun. 2007.

(Continued)

*Primary Examiner* — Peter M Novak (74) *Attorney, Agent, or Firm* — Armstrong Teasdale LLP (57) ABSTRACT

Technologies for providing secure emergency power control of a high voltage direct current transmission (HVDC) system include a controller. The controller includes circuitry configured to receive status data indicative of a present physical status of a power system. The circuitry is also configured to obtain an emergency power control command triggered by a remote source. The emergency power control command is to be executed by an HVDC transmission system of the power system. Further, the circuitry is configured to determine, as a function of the status data, whether the emergency power control command is consistent with the present physical status of the power system and block, in response to a determination that the emergency power control command is not consistent with the present physical status of the power system, execution of the emergency power control command by the HVDC transmission system.

19 Claims, 8 Drawing Sheets

(56) References Cited

OTHER PUBLICATIONS

R. King, O. Bagleybter, D. Wilson, J. Yu, "HVDC Stability Control using Wide Area Measurements for Optimizing Transmission Boundary Transfer" 11th IET International Conference on AC and DC Power Transmission, Birmingham, UK, Feb. 2015.

A. Maria and H. Ghasemi, "Development of a Dynamic Equivalent Model for Ontario's External System", IEEE PES General Meeting, Calgary, Canada, Jul. 2009.

M. Matar and N. Fernandopulle, "Dynamic model reduction using integrated PSS/E and Matlab", Canadian Conference on Electrical & Computer Engineering (CCECE), Oct. 2012.

L. Zhu, X. Wu, D. Liu, "An engineering applicable dynamic equivalent method for large-scale AC system connected to VSC-HVDC", IEEE PES Asia-Pacific Power and Energy Engineering Conference (APPEEC), Oct. 2016.

Y. Zhou, Q. Wang, B. Zhang, "A real-time dynamic equivalent solution for large interconnected power systems" Electric Utility Deregulation and Restructuring and Power Technologies (DRPT), Jul. 2011.

F. Visconti, L. F. W. de Souza, J. M. S. C. Costa, N. R. B. Sobrinho, "Measurement-based Load Modelling of Systems with Dispersed Generation", CIGRE, 2012.

G. Liao, M. Li, S. Xiao, "Measurement-based dynamic equivalent modeling for small and medium hydropower generator group", Smart Grid and Clean Energy Technologies (ICSGCE), Oct. 2016.

\* cited by examiner

TECHNOLOGIES FOR PROVIDING SECURE EMERGENCY POWER CONTROL OF HIGH VOLTAGE DIRECT CURRENT TRANSMISSION SYSTEM

STATEMENT REGARDING FEDERALLY SPONSORED RESEARCH

This invention was made with Government support under contract number DE-OE0000824 awarded by the Department of Energy. The Government has certain rights in this invention.

BACKGROUND

High voltage direct current (HVDC) transmission systems are key contributors to transmitting bulk electric energy efficiently over long distances and to enabling electric energy trading between synchronous as well as asynchronous power systems. Many HVDC transmission systems have transmission capacity higher than the largest power plant in a power system. Two basic converter technologies are used in modern HVDC transmission systems. These are classical line-commutated converters (LCCs) and self-commutated voltage source converters (VSCs). VSC-HVDC systems have the capability to rapidly control both active and reactive power, independently of each other, including the capability of reversing power flow direction instantly. LCC-HVDC systems allow fast active power control and have inherent transient overloading capability (e.g. 30-50% beyond the rated capacity) for a short period of time.

The fast power control capability of HVDC systems has been used for implementing various high-level control functions at power grid level, such as damping control, frequency control and emergency power control, to enhance grid stability and resiliency. Of particular importance is the emergency power control (EPC) of HVDC systems for improving grid transient stability under severe disturbances. The EPC actions can be initiated by signals derived within a converter controller of an HVDC system based on system situational information from wide area measurement systems (WAMS) or can be triggered directly by inputs from individual Special Protection Schemes (SPS) which are also called Remedial Action Schemes (RAS). However, there is a potential cyber security issue for the EPC functions that are triggered by remote commands. An unauthorized control attack to initiate EPC actions may cause drastic changes in system states, resulting in severe network dynamics and power flow violations which may lead to cascading outages or transient instability.

SUMMARY OF THE INVENTION

In one aspect, the present disclosure provides a method for providing secure emergency power control of a high voltage direct current (HVDC) transmission system. The method includes receiving, by an apparatus, status data indicative of a present physical status of a power system. The method also includes obtaining, by the apparatus, an emergency power control command triggered by a remote source. The emergency power control command is to be executed by an HVDC transmission system of the power system. Additionally, the method includes determining, by the apparatus and as a function of the status data, whether the emergency power control command is consistent with the present physical status of the power system. Further, the method includes blocking, by the apparatus and in response to a determination that the emergency power control command is not consistent with the present physical status of the power system, execution of the emergency power control command by the HVDC transmission system.

In another aspect, the present disclosure provides a controller for providing secure emergency power control of a high voltage direct current (HVDC) transmission system. The controller includes circuitry configured to receive status data indicative of a present physical status of a power system. The circuitry is also configured to obtain an emergency power control command triggered by a remote source. The emergency power control command is to be executed by an HVDC transmission system of the power system. Further, the circuitry is configured to determine, as a function of the status data, whether the emergency power control command is consistent with the present physical status of the power system and block, in response to a determination that the emergency power control command is not consistent with the present physical status of the power system, execution of the emergency power control command by the HVDC transmission system.

In yet another aspect, the present disclosure provides one or more machine-readable storage media having a plurality of instructions stored thereon that, in response to being executed, cause a controller to receive status data indicative of a present physical status of a power system. The instructions may also cause the controller to maintain a history of the physical status. The instructions also cause the controller to obtain an emergency power control command triggered by a remote source. The emergency power control command is to be executed by a high voltage direct current (HVDC) transmission system of the power system. Additionally, the instructions cause the controller to determine, as a function of the status data, whether the emergency power control command is consistent with the present physical status of the power system and block, in response to a determination that the emergency power control command is not consistent with the present physical status of the power system, execution of the emergency power control command by the HVDC transmission system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
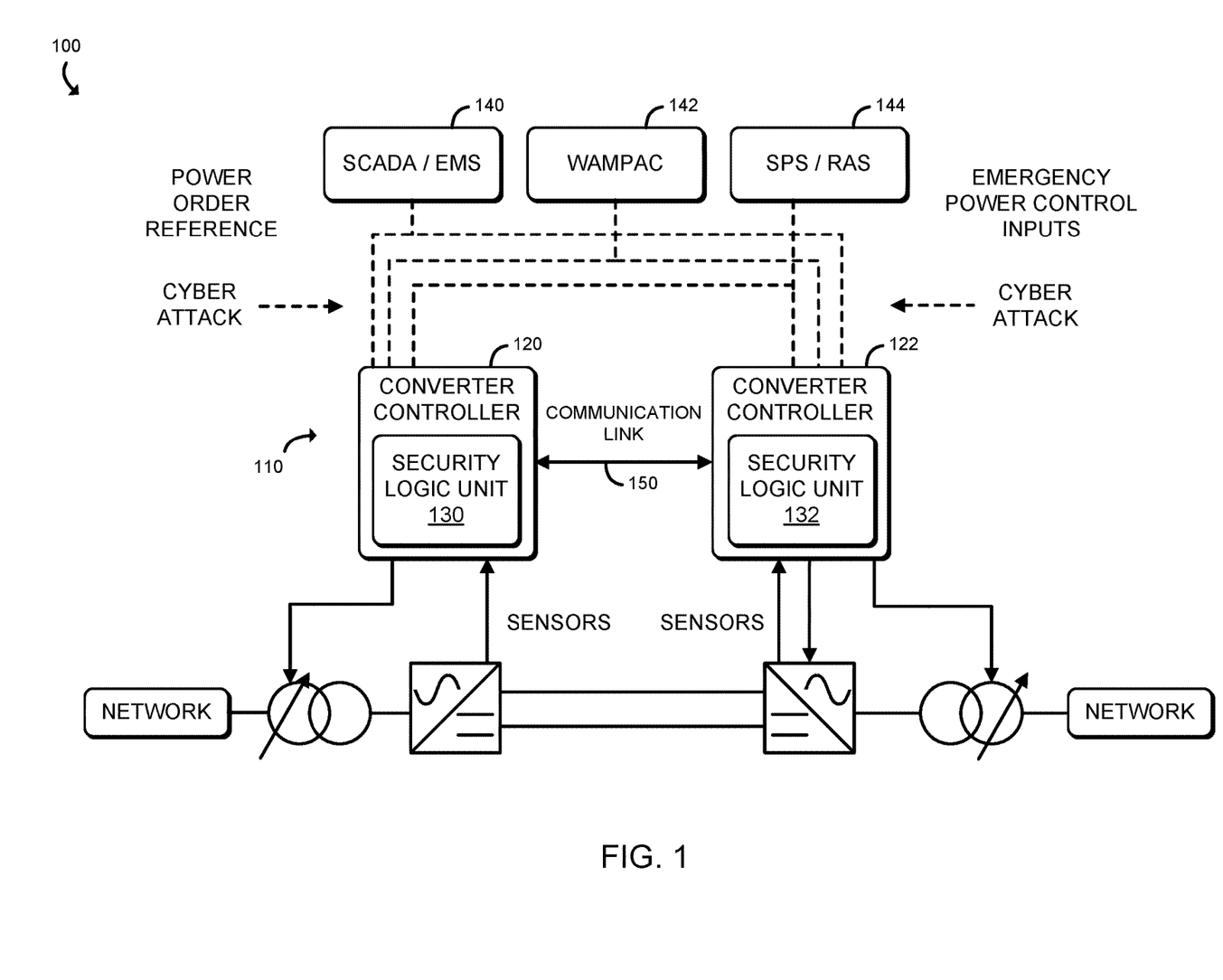
FIG. 1 is a simplified block diagram of at least one embodiment of a power system that includes a high voltage direct current (HDC) transmission system with secure emergency power control.

Referring now to FIG. 1, a power system 100 includes a high voltage direct current (HVDC) transmission system 110 with secure emergency power control. The HVDC transmission system 110, in operation, receives power orders from a system operator (e.g., the Supervisory Control and Data Acquisition/Energy Management Systems (SCADA/EMS) 140 and emergency power control inputs from a wide area monitoring protection and control (WAMPAC) system 142 and/or Special Protection Schemes (SPS)/Remedial Action Schemes (RAS) systems 144. Unlike typical HVDC transmission systems, in the illustrative embodiment, the HVDC transmission system 110 includes, in each converter controller 120, 122 (e.g., any device or circuitry configured to execute control commands to change a flow of power through the power system 100), a security logic unit 130, 132, which may be embodied as any device or circuitry (e.g., a processor, a microcontroller, an application specific integrated circuit (ASIC), a field programmable gate array (FPGA), etc.) or software configured to determine whether inputs (e.g., data indicative of alleged conditions in the power system 100) from remote sources (e.g., the WAMPAC system 142 and/or the SPS/RAS systems 144) are erroneous (e.g., accidental, due to a malfunction, a result of a cyber attack, etc.). If so, the converter controllers 120, 122 block the execution of a corresponding emergency power control command that may otherwise be executed to correct the conditions indicated in the inputs from the remote sources, thereby preventing actions that may cause instability or failure of the power system 100. In doing so, and as described in more detail herein, a converter controller (e.g., the converter controller 120) may determine whether a triggered emergency power control command is inconsistent with the present state of the power network, as determined from status data reported from sensors and/or another converter controller (e.g., the converter controller 122) through a communication link 150 (e.g., any network capable of communicating data). Further, in doing so, the converter controller 120 may determine whether execution of the emergency power control command is infeasible (e.g., by simulating, in faster than real time, execution of the command in a model of a subset of the components of the power system 100).

Figure 2:
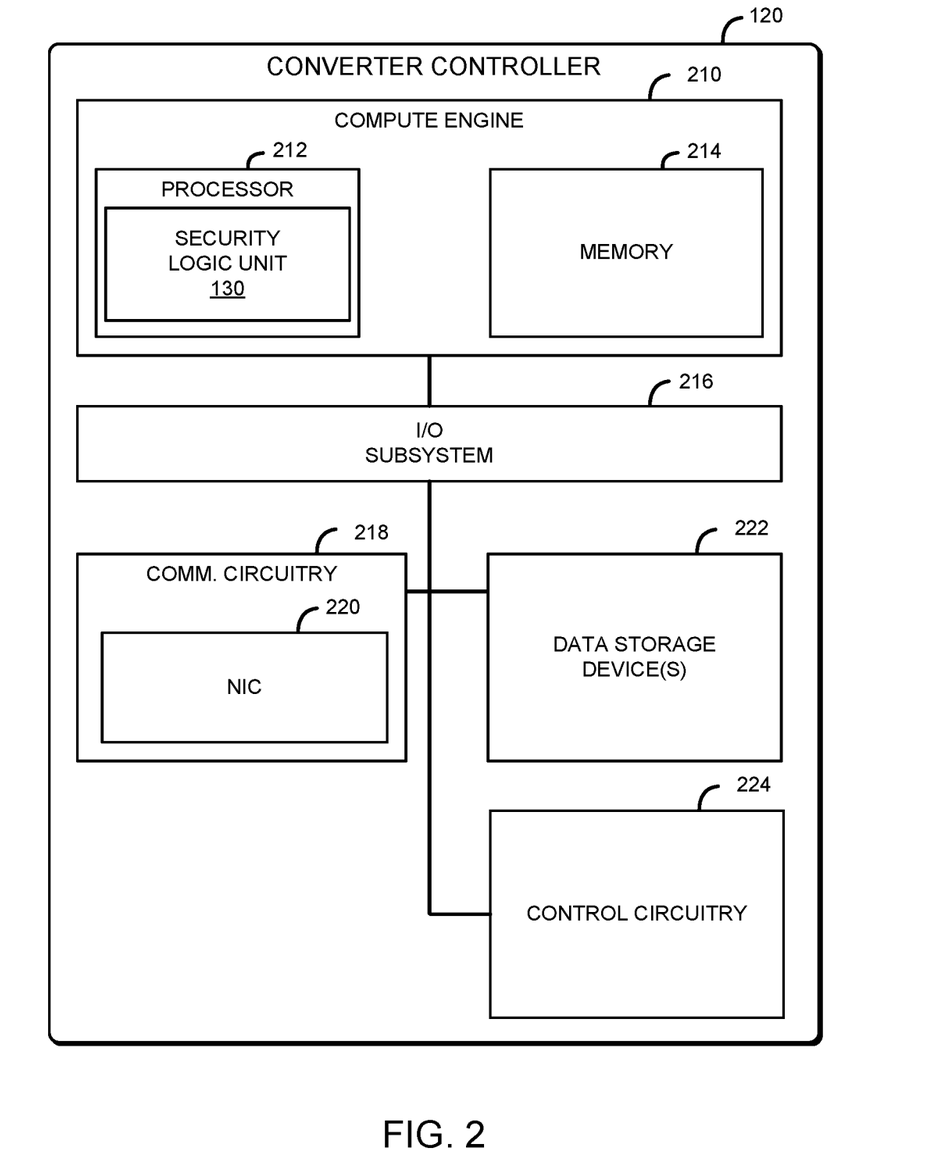
FIG. 2 is a simplified block diagram of at least one embodiment of a converter controller of the system of FIG. 1.

Referring now to FIG. 2, the converter controller 120 may be embodied as any type of device (e.g., a computer) capable of performing the functions described herein, including receiving status data indicative of a present physical status of a power system, obtaining an emergency power control command triggered by a remote source, determining as a function of the status data, whether the emergency power control command is consistent with the present physical status of the power system, and blocking, in response to a determination that the emergency power control command is not consistent with the present physical status of the power system, execution of the emergency power control command by the HVDC transmission system 110.

As shown in FIG. 2, the illustrative converter controller 120 includes a compute engine 210, an input/output (I/O) subsystem 216, communication circuitry 218, one or more data storage devices 222, and control circuitry 224. Of course, in other embodiments, the converter controller 120 may include other or additional components, such as those commonly found in a computer (e.g., display, peripheral devices, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a microcontroller, a single or multi-core processor(s), or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, the processor 212 includes the security logic unit 130 described above with reference to FIG. 1. In other embodiments, the security logic unit 130 may be located elsewhere (e.g., not in the processor 212).

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as status data indicative of the physical status of the power system 100, received input data from remote sources (e.g., the WAMPAC system 142 and/or the SPS/RAS systems 144), one or more emergency power control commands that have been triggered, a model of the power system 100, applications, programs, libraries, and drivers.

The compute engine 210 is communicatively coupled to other components of the converter controller 120 via the I/O subsystem 216, which may be embodied as circuitry and/or components to facilitate input/output operations with the compute engine 210 (e.g., with the processor 212 and/or the main memory 214) and other components of the converter controller 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the converter controller 120, into the compute engine 210.

The communication circuitry 218 may be embodied as any communication circuit, device, or collection thereof, capable of enabling communications over a network between the converter controller 120 and another device (e.g., the converter controller 122, the WAMPAC system 142, the SPS/RAS systems 144, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 210. The NIC 220 may be embodied as one or more add-in-boards, daughter cards, network interface cards, controller chips, chipsets, or other devices that may be used by the converter controller 120 to connect with another device (e.g., the converter controller 122, the WAMPAC system 142, the SPS/RAS systems 144, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the converter controller 120 at the board level, socket level, chip level, and/or other levels.

Figure 10:
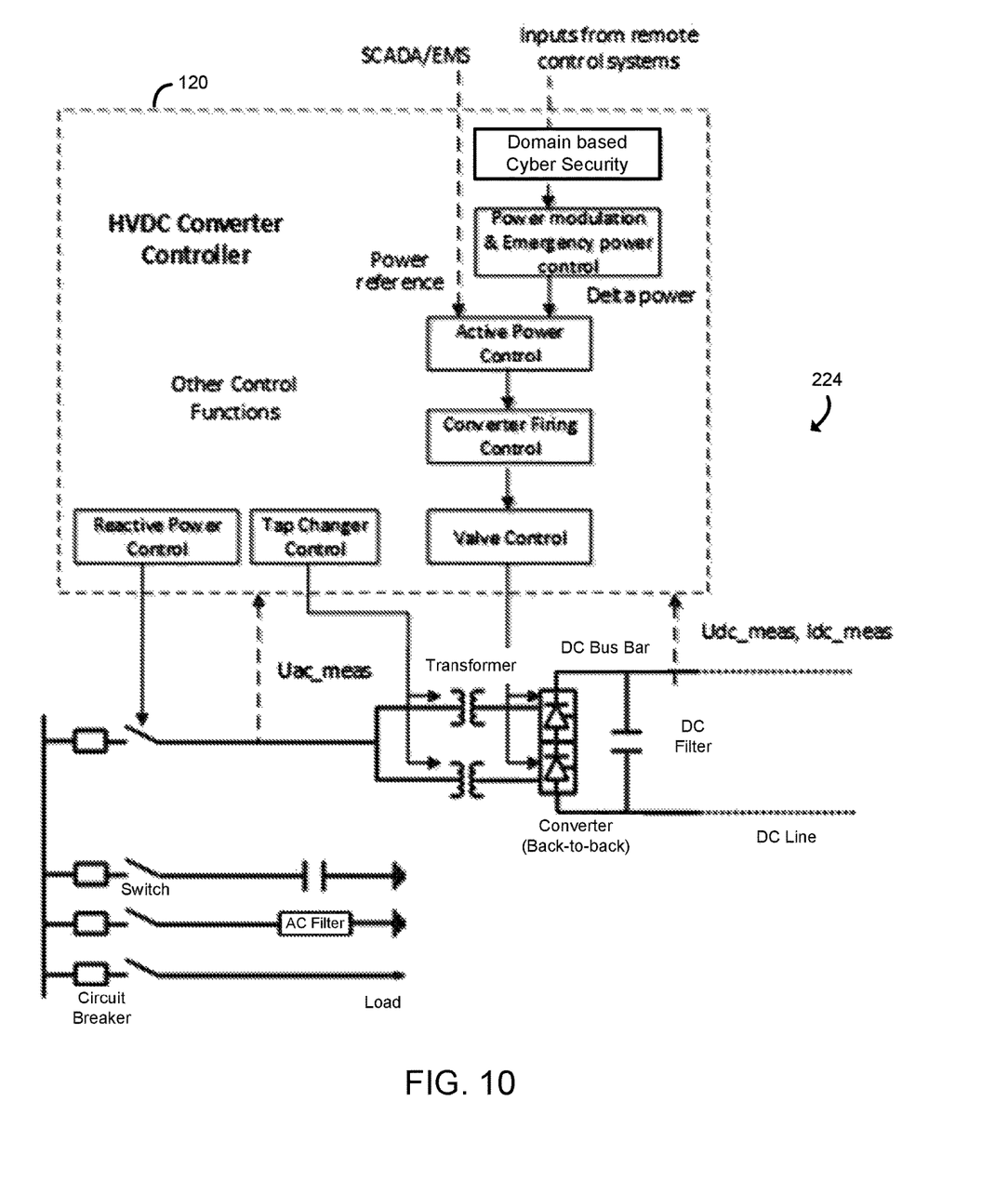
FIG. 10 is a schematic diagram of the HVDC converter controller with secure emergency power control of FIGS. 1 and 2.

The one or more illustrative data storage devices 224 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include an operating system partition that stores data files and executables for an operating system. The control circuitry 224 may be embodied as any device or circuitry configured to issue commands to power distribution equipment (e.g., circuit breakers, transformers, etc.) to control the flow of power through the power system 100. A schematic diagram of the converter controller 120, including the control circuitry 224, is shown in FIG. 10. Additionally, though shown as being in a single unit, it should be understood that in other embodiments, the components of the converter controller 120 may be disaggregated (e.g., distributed across multiple racks, sites, etc.).

The converter controller 122, the SCADA/EMS system 140, the WAMPAC system 142, and the SPS/RAS systems 144 may have components similar to those described in FIG. 2 with reference to the converter controller 120. The description of those components of the converter controller 120 is equally applicable to the description of components of the converter controller 122, the SCADA/EMS system 140, the WAMPAC system 142, and the SPS/RAS systems 144, with the exception that, in the illustrative embodiment, the SCADA/EMS system 140, the WAMPAC system 142, and the SPS/RAS systems 144 do not include the security logic unit 130 or the control circuitry 224. Further, it should be appreciated that any of the converter controllers 120, 122 and the SCADA/EMS system 140, the WAMPAC system 142, and the SPS/RAS systems 144 may include other components, sub-components, and devices commonly found in a computing device, which are not discussed above in reference to the converter controller 120 and not discussed herein for clarity of the description.

The converter controllers 120, 122, the SCADA/EMS system 140, the WAMPAC system 142, the SPS/RAS system 144, sensors, and other components of the power system 100 are illustratively in communication via a network (including the communication link 150), which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
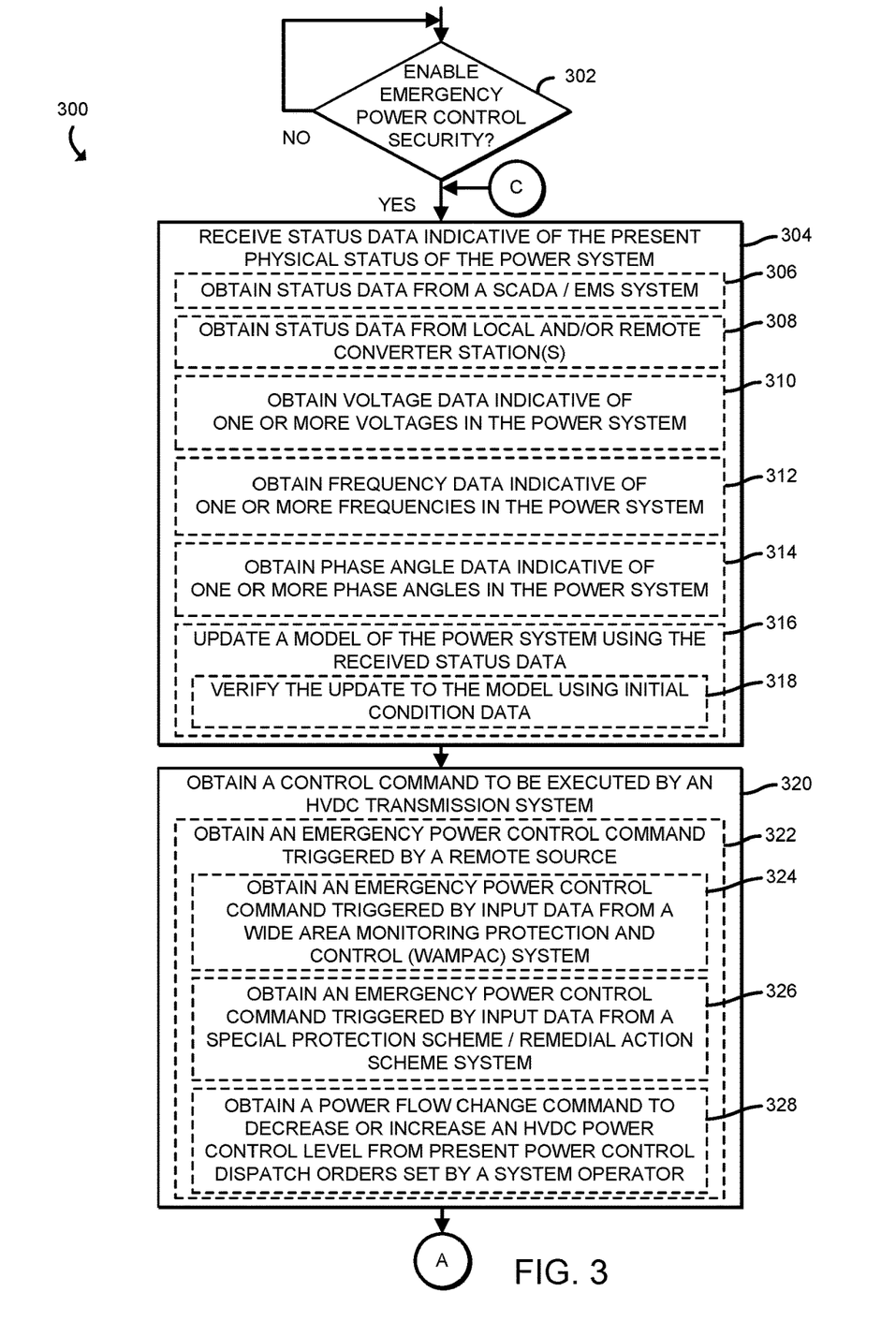
FIGS. 3-5 are a simplified block diagram of at least one embodiment of a method for providing secure emergency power control that may be performed by the converter controller of FIGS. 1 and 2.

Referring now to FIG. 3, the converter controller 120, in operation, may perform a method 300 for providing secure emergency power control. The method 300 begins with block 302, in which the converter controller 120 determines whether to enable emergency power control security. In doing so, the converter controller 120 may determine whether the converter controller 120 is equipped with the security logic unit 130, whether a request has been received (e.g., from the SCADA/EMS system 140) to enable emergency power control security, and/or based on other factors. Regardless, in response to a determination to enable emergency power control security, the method 300 advances to block 304, in which the converter controller 120 receives status data indicative of the present physical status of the power system 100. In doing so, and as indicated in block 306, the converter controller 120 may obtain status data from the SCADA/EMS system 140. Additionally or alternatively, the converter controller 120 may obtain status data from the local converter station (e.g., from sensors in communication with the converter controller 120) and/or from a remote converter station, as indicated in block 308. As indicated in block 310, the converter controller 120 may obtain voltage data indicative of one or more voltages in the power system 100. Additionally or alternatively, the converter controller 120 may obtain frequency data indicative of one or more frequencies in the power system, as indicated in block 312. The converter controller 120 may also obtain phase angle data indicative of one or more phase angles in the power system 100, as indicated in block 314. Additionally, and as indicated in block 316, the converter controller 120 may update a model of the power system 100 using the received status data. In doing so, and as indicated in block 318, the converter controller 120 may verify that the updated status data is accurate, by comparing the updated status data to initial condition data indicative a known status of the power system 100 prior to receipt of the updated status data (e.g., to determine whether a change in status represented in the received updated status data was physically possible). Example embodiments of the model 600, 700, 800 are described in more detail herein, with reference to FIGS. 6-8.

In block 320, the converter controller 120 may obtain a control command to be executed by an HVDC transmission system (e.g., by the HVDC transmission system 110 that includes the converter controller 120). As indicated in block 322, the control command may be an emergency power control command that has been triggered by a remote source. For example, and as indicated in block 324, the converter controller 120 may obtain an emergency power control command that was triggered by input data from the WAM-PAC system 142. Alternatively, the converter controller 120 may obtain an emergency power control command that was triggered by input data from the SPS/RAS system 144, as indicated in block 326. In obtaining the control command, the converter controller 120 may obtain a power flow change command to decrease or increase an HVDC power control level from present power control dispatch orders set by a system operator, as indicated in block 328. Afterwards, the method 300 advances to block 330 of FIG. 4, in which the converter controller 120 determines the subsequent course of action based on whether a control command has been obtained.

Figure 4:
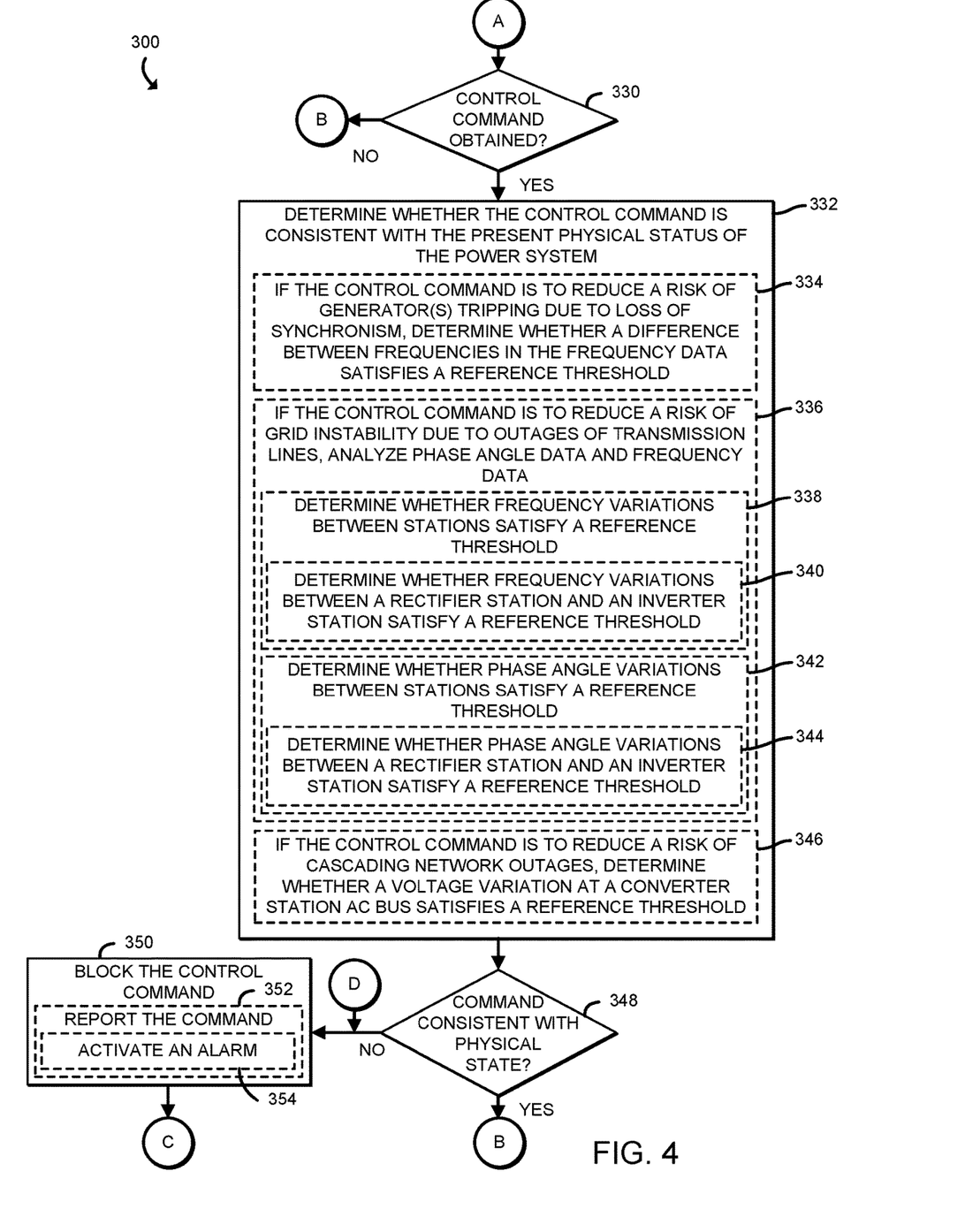

Referring now to FIG. 4, if the converter controller 120 has not obtained a control command, the method 300 loops back to block 304 to receive further status data and potentially obtain a control command Otherwise (e.g., if a control command was obtained in block 320), the method 300 advances to block 332, in which the converter controller 120 determines whether the control command is consistent with the present physical status of the power system 100. In doing so, and as indicated in block 334, if the control command is to reduce a risk of generator(s) tripping due to loss of synchronism, the converter controller 120 may determine whether a difference between the received frequencies represented in the frequency data and the system nominal frequency (60 Hz in the United States or 50 Hz in other regions) satisfies a reference threshold. If no significant off-frequency is detected (e.g., if the reference threshold is not satisfied) from the status data (e.g., received in block 304), then the converter controller 120, in the illustrative embodiment, determines that the control command is inconsistent with the present physical status of the power system 100. The analysis is represented below in Equation 1:

If $\Delta f < \Delta f_{THRESHOLD}$ THEN BLOCK COMMAND (Equation 1)

As indicated in block 336, if the control command is to reduce a risk of grid instability due to outages of transmission lines or generators, the converter controller 120, in the illustrative embodiment, analyzes the phase angle data and the frequency data collected in block 304. In doing so, and as indicated in block 338, the converter controller 120 determines whether frequency variations between stations in the power system 100 satisfy a reference threshold. For example, and as indicated in block 340, the converter controller 120 determines whether frequency variations between a rectifier station and an inverter station satisfy a reference threshold. If not, then the converter controller 120 determines that the control command is inconsistent with the present physical status of the power system 100. The analysis is shown below in Equation 2:

If $|f_{RECTIFIER} - f_{INVERTER}| < \Delta f_{THRESHOLD}$ THEN BLOCK COMMAND (Equation 2)

In Equation 2, $f_{RECTIFIER}$ and $f_{INVERTER}$ are the frequencies of the rectifier station and the inverter station, respectively. Similarly, in block 342, the converter controller 120 may determine whether phase angle variations represented in the status data from block 304 satisfy a reference threshold. In doing so, the converter controller 120 may determine whether phase angle variations between the rectifier station and the inverter station satisfy a reference threshold, as indicated in block 344. If not, then the converter controller 120 determines that the control command is inconsistent with the present physical status of the power system 100. The analysis is shown below in Equation 3:

If $\theta_{RECTIFIER} - \theta_{INVERTER} - \Delta\theta_{REFERENCE} < \Delta\theta_{THRESHOLD}$ THEN BLOCK COMMAND (Equation 3)

In Equation 3, $\theta_{RECTIFIER}$ and $\theta_{INVERTER}$ are voltage phase angles at the rectifier station and the inverter station, respectively. In normal system conditions, the frequencies measured at rectifier and inverter stations differ by a small amount. The reference angle difference, $\Delta\theta_{REFERENCE}$, is the difference of voltage phase angles between the rectifier and inverter stations under normal conditions prior to obtaining the control command. As another example, and as indicated in block 346, if the control command is to reduce a risk of cascading network outages resulting from grounding faults and line outages, the converter controller 120 may determine whether a voltage variation at a converter station alternating current (AC) bus satisfies a reference threshold. If not, the converter controller 120, in the illustrative embodiment, determines that the control command is inconsistent with the physical status of the power system 100. The analysis is shown below in Equation 4:

If $\Delta Uac < \Delta U_{THRESHOLD}$ THEN BLOCK COMMAND (Equation 4)

Afterwards, in block 348, the converter controller 120 determines the subsequent course of action based on whether the control command has been determined to be consistent with the present physical status of the power system 100. If not, the method 300 advances to block 350, in which the converter controller blocks the control command from being executed (e.g., does not send the control command to the control circuitry 224 to be executed). In doing so, the converter controller 120 may report the control command (e.g., store a record of the control command in a log file), as indicated in block 352 and may activate an alarm indicating that an erroneous control command was triggered (e.g., indicating the presence of a cyber attack), as indicated in block 354. In the illustrative embodiment, if the control command is consistent with the present physical status of the power system 100, the method 300 advances to block 356 of FIG. 5, in which the converter controller 120 determines, from a model of the power system 100, whether execution of the control command is feasible. In some embodiments, rather than advancing to block 356, the method 300 instead advances to block 380 of FIG. 5 to allow execution of the control command and then loops back to block 302 to await additional status data and/or another control command.

Figure 5:
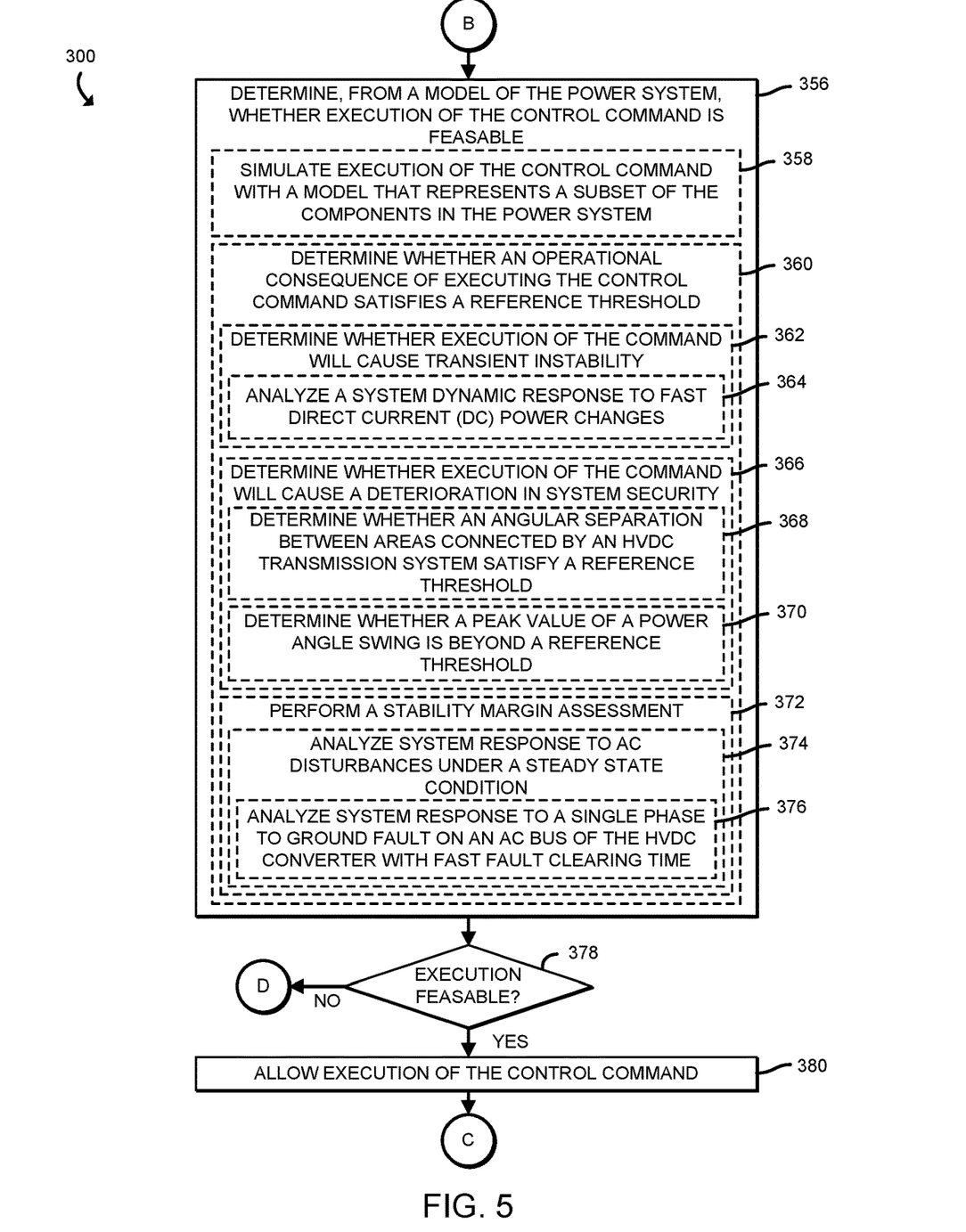

Referring now to FIG. 5, in the illustrative embodiment, in determining whether execution of the control command is feasible, the converter controller 120 simulates execution of the control command with a model that represents a subset (e.g., the components that will be most affected by the control command) of the components in the power system 100 (e.g., to enable faster processing of the simulation), as indicated in block 358. In block 360, the converter controller 120 may determine whether an operational consequence of executing the control command satisfies a reference threshold. In doing so, the converter controller 120 determines whether execution of the command will cause transient instability in the power system 100, as indicated in block 362. As indicated in block 364, the converter controller 120 analyzes a system dynamic response to fast direct current (DC) power changes. As indicated in block 366, the converter controller 120 determines whether execution of the control command will cause a deterioration in system security. A deterioration in system security can be indicated by a high (e.g., beyond a predefined accepted limit) angular separation between multiple areas connected by the HVDC transmission system 110. As indicated in block 368, the converter controller 120 determines whether an angular separation between areas connected by the HVDC transmission system 110 satisfies a reference threshold. The analysis is shown below in Equation 5:

$$\text{If SIMULATED } \theta_{RECTIFIER} - \theta_{INVERTER} - \Delta\theta_{REFERENCE} > \Delta\theta_{THRESHOLD} \text{ THEN BLOCK COMMAND} \quad \text{(Equation 5)}$$

Figure 9:
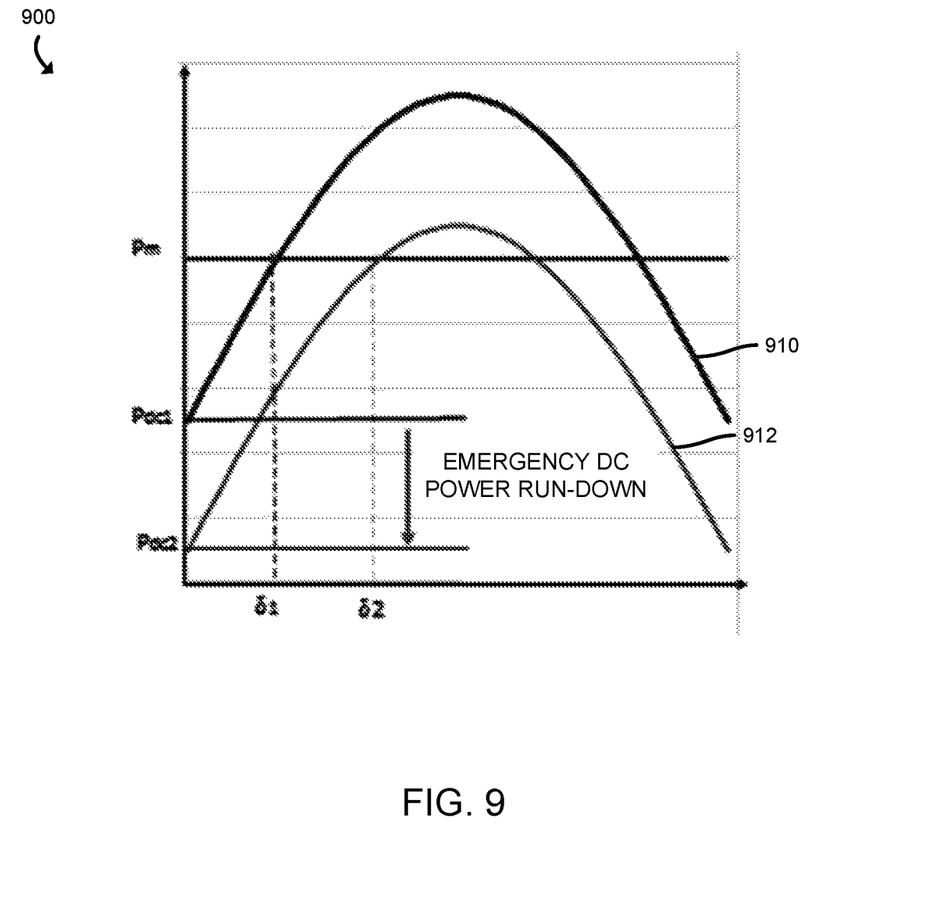
FIG. 9 is a simplified diagram of power-angle curves of a parallel alternating current (AC)-direct current (DC) corridor before and after emergency power control actions, that may be analyzed by the converter controller of FIGS. 1 and 2.

As indicated in block 370, the converter controller 120 may determine whether a peak (e.g., maximum) value of a power angle swing is beyond (e.g., does not satisfy) a reference threshold. A diagram 900 of example power angle curves of a parallel AC-DC corridor before and after an emergency power control action is shown in FIG. 9. Curve 910 is the power-angle curve before the emergency power control command is executed and curve 920 is the power-angle curve after the emergency power control command is executed. Additionally or alternatively, as indicated in block 372, the converter controller 120 may perform a stability margin assessment. In doing so, the converter controller 120 may analyze a system response (e.g., a simulated response of the power system 100) to alternating current (AC) disturbances under a steady state condition, as indicated in block 374. As indicated in block 376, the converter controller 120 may analyze a system response to a single phase to ground fault on an AC bus of the HVDC converter with fast fault clearing time. Subsequently, in block 378, the converter controller 120 determines the subsequent course of action based on whether execution of the control command is feasible (e.g., as determined in block 356). If not, the method 300 proceeds to block 350 of FIG. 4, in which the converter controller 120 blocks the control command and may additionally report the control command and/or activate an alarm. Otherwise, if execution of the control command is feasible, the method advances to block 380, in which the converter controller 120 allows execution of the control command (e.g., the control circuitry 224 executes the control command).

Figure 6:
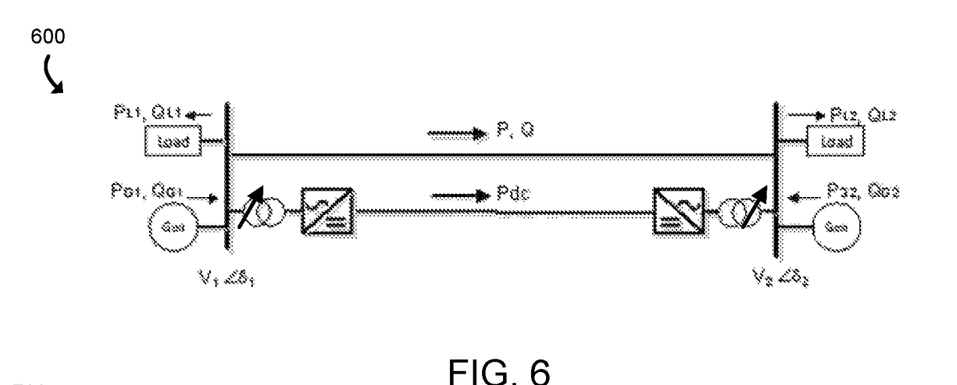
FIGS. 6-8 are simplified diagrams of models that may be utilized by the converter controller of FIGS. 1 and 2 to simulate consequences of executing emergency power control commands.

FIG. 6 illustrates a single line diagram of a model 600 of an equivalent system that can be used for operational feasibility assessment of HVDC links. In the equivalent system model 600, the HVDC link operates in parallel with an AC line. The parallel AC and DC lines are terminated at the same converter station AC buses. At least one equivalent generator and at least one equivalent load are connected to each converter station. The equivalent generators and equivalent loads can be represented by machine dynamic models and load models as used in power system dynamic solution tools. Given a base case power system model, there are established procedures to develop a reduced dynamic equivalent for different system performance study purposes. General guidelines are as follows concerning the operational feasibility of parallel AC-DC transmission corridors: (i) the power-angle characteristics of the equivalent AC line (i.e., line impedances) are predetermined for a range of typical system configurations and operating conditions; (ii) the active and reactive power capability of the equivalent generators at each end of the AC-DC transmission corridors are predetermined for a range of typical area load and inter-area power transfer conditions; (iii) the dynamic parameters of the equivalent generators at each end of the AC-DC transmission corridors, including inertial constant, transient impedance, governor response time constants, etc. are predetermined to represent the dominated generation dynamic characteristics.

Figure 7:
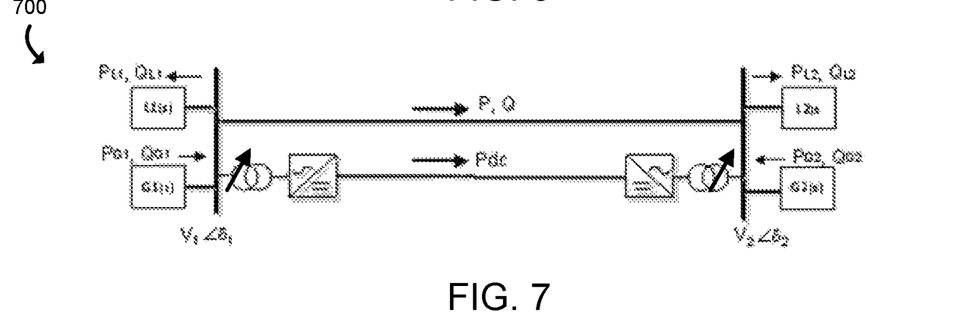
Figure 8:
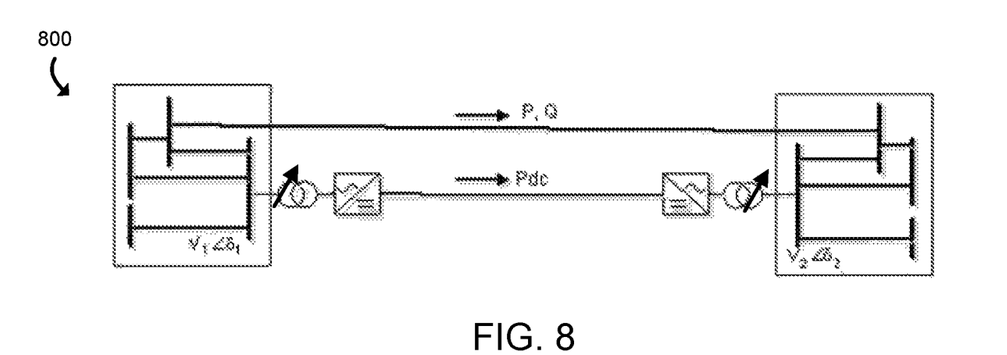

As shown in FIG. 7, the equivalent generators and loads can be represented by a measurement-based dynamic model 700. With measurement-based dynamic modeling, typical input-output system data are selected and used to estimate a set of parameters for a transfer function that better fits these input-output data. There is no need to choose a mathematical model with any physical meaning, but rather a structure as simple as possible, that fits measured data and thus approximates the dynamic behavior of generator, load or subsystem. For example, the equivalent dynamic generator model can be represented by a third order electromechanical transient model with damping and inertia. More generally, the equivalent system for operational feasibility assessment can include the connections from the HVDC converter stations to major neighboring substations, as represented in the model 800 of FIG. 8.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method comprising:
receiving, by an apparatus, status data indicative of a present physical status of a power system, wherein the status data include data acquired by sensors in communication with at least one of a local converter station or a remote converter station, and wherein the status data includes frequency data indicative of one or more frequencies in the power system;
obtaining, by the apparatus, an emergency power control command triggered by a remote source, wherein the emergency power control command is to be executed by a high voltage direct current (HVDC) transmission system of the power system;
determining, by the apparatus and as a function of the status data, whether the emergency power control command is consistent with the present physical status of the power system represented by the status data by:
comparing whether a difference between the received one or more frequencies in the power system and a system nominal frequency is greater than a reference threshold; and
blocking, by the apparatus and in response to a determination that the emergency power control command is not consistent with the present physical status of the power system, execution of the emergency power control command by the HVDC transmission system.

2. The method of claim 1, wherein to obtain an emergency power control command triggered by a remote source comprises to obtain an emergency power control command triggered by input data received from a wide area monitoring protection and control (WAMPAC) system, a special protection scheme (SPS) system, or a remedial action scheme (RAS) system.

3. The method of claim 1, wherein to obtain an emergency power control command comprises to obtain a command to perform a remedial action to change a power flow of the HVDC transmission system.

4. The method of claim 1, wherein receiving status data comprises receiving frequency data indicative of frequencies of at least one of a rectifier station or an inverter station in the power system and wherein determining whether the emergency power control command is consistent with the physical status of the power system comprises, in response to a determination that the emergency power control command is to reduce a risk of one or more generators tripping due to loss of synchronism, comparing whether a difference between the received frequencies of the at least one of the rectifier station or the inverter station and the system nominal frequency is greater than the reference threshold.

5. The method of claim 1, wherein receiving status data comprises receiving frequency data indicative of frequencies of at least one of a rectifier station or an inverter station in the power system and phase angle data indicative of phase angles of at least one of the rectifier station or the inverter station in the power system, and wherein determining whether the emergency power control command is consistent with the present physical status of the power system comprises analyzing the frequency data and the phase angle data, in response to a determination that the emergency power control command is to reduce a risk of grid instability due to outages of transmission lines or generators.

6. The method of claim 5, wherein analyzing the phase angle data comprises comparing whether phase angle variations between the rectifier station and the inverter station is greater than the reference threshold.

7. The method of claim 1, wherein determining whether the emergency power control command is consistent with the physical status of the power system comprises determining, in response to a determination that the emergency power control command is to reduce a risk of cascading network outages, whether a voltage variation at a converter station alternating current (AC) bus satisfies a reference threshold.

8. The method of claim 1, further comprising determining, by the apparatus and from a model of the power system, whether execution of the emergency power control command is feasible and wherein blocking the execution of the emergency power control command comprises blocking execution of the power control command in response to a determination that execution of the power control command is not feasible.

9. The method of claim 8, wherein determining whether execution of the emergency power control command is feasible comprises simulating execution of the emergency power control command with a model that represents a subset of components in the power system.

10. The method of claim 8, wherein determining whether execution of the emergency power control command is feasible comprises determining whether a steady state angular separation between a rectifier station and an inverter station connected by the HVDC transmission system satisfy a reference threshold.

11. The method of claim 8, wherein determining whether execution of the emergency power control command is feasible comprises determining whether a peak value of angular separation between areas connected by the HVDC transmission system satisfy a reference threshold.

12. The method of claim 8, wherein determining whether execution of the emergency power control command is feasible comprises analyzing a response of the power system to a ground fault on an alternating current bus of an HVDC converter of the HVDC transmission system.

13. The method of claim 1, further comprising allowing execution of the command in response to a determination that the emergency power control command is consistent with the present physical status of the power system and that execution of the emergency power control command is feasible.

14. The method of claim 1, wherein blocking the command further comprises activating an alarm.

15. A controller comprising:
circuitry configured to:
receive status data indicative of a present physical status of a power system, wherein the status data include data acquired by sensors in communication with at least one of a local converter station or a remote converter station, and wherein the status data includes frequency data indicative of one or more frequencies in the power system;
obtain an emergency power control command triggered by a remote source, wherein the emergency power control command is to be executed by a high voltage direct current (HVDC) transmission system of the power system;

determine, as a function of the status data, whether the emergency power control command is consistent with the present physical status of the power system represented by the status data by:
    comparing whether a difference between the received one or more frequencies in the power system and a system nominal frequency is greater than a reference threshold; and
block, in response to a determination that the emergency power control command is not consistent with the present physical status of the power system, execution of the emergency power control command by the HVDC transmission system.

16. The controller of claim 15, wherein to obtain an emergency power control command triggered by a remote source comprises to obtain an emergency power control command triggered by input data received from a wide area monitoring protection and control (WAMPAC) system, a special protection scheme (SPS) system, or a remedial action scheme (RAS) system.

17. The controller of claim 15, wherein to receive status data comprises to receive frequency data indicative of frequencies of at least one of a rectifier station or an inverter station in the power system and wherein to determine whether the emergency power control command is consistent with the physical status of the power system comprises to determine, in response to a determination that the emergency power control command is to reduce a risk of one or more generators tripping due to loss of synchronism, comparing whether a difference between the received frequencies of the at least one of the rectifier station or the inverter station and the system nominal frequency is greater than the reference threshold.

18. The controller of claim 15, wherein the circuitry is further configured to determine, from a model of the power system, whether execution of the emergency power control command is feasible and wherein to block the execution of the emergency power control command comprises to block execution of the power control command in response to a determination that execution of the power control command is not feasible.

19. The controller of claim 18, wherein determining whether execution of the emergency power control command is feasible comprises simulating execution of the emergency power control command with a model that represents a subset of components in the power system.

* * * * *